US010784014B1

(12) United States Patent
Neveux, Jr. et al.

(10) Patent No.: US 10,784,014 B1
(45) Date of Patent: Sep. 22, 2020

(54) CABLES WITH FOAMED INSULATION SUITABLE FOR AIR-BLOWN INSTALLATION

(71) Applicant: Superior Essex International LP, Atlanta, GA (US)

(72) Inventors: Paul E. Neveux, Jr., Atlanta, GA (US); Christopher W. McNutt, Woodstock, GA (US); Bernhart A. Gebs, Powder Springs, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 16/447,306

(22) Filed: Jun. 20, 2019

(51) Int. Cl.
*H01B 7/02* (2006.01)
*H01B 3/44* (2006.01)
*H01B 17/58* (2006.01)
*C08J 9/00* (2006.01)

(52) U.S. Cl.
CPC ............ *H01B 3/445* (2013.01); *C08J 9/0061* (2013.01); *H01B 3/441* (2013.01); *H01B 7/02* (2013.01); *H01B 17/58* (2013.01); *C08J 2205/05* (2013.01); *C08J 2323/06* (2013.01); *C08J 2323/12* (2013.01); *C08J 2327/06* (2013.01); *C08J 2327/16* (2013.01)

(58) Field of Classification Search
USPC ........... 174/110 R, 112, 113 R, 120 R, 121 R
See application file for complete search history.

(56) References Cited

U.S. PATENT DOCUMENTS

| | | | | |
|---|---|---|---|---|
| 2,583,025 A | * | 1/1952 | Swift | H01B 7/182 174/117 R |
| 2,583,026 A | * | 1/1952 | Swift | H01B 7/188 174/117 R |
| 5,990,419 A | * | 11/1999 | Bogese, II | H01B 7/184 174/113 AS |
| 6,037,546 A | | 3/2000 | Mottine et al. | |
| 6,147,309 A | | 11/2000 | Mottine et al. | |
| 7,135,641 B2 | * | 11/2006 | Clark | H01B 7/184 174/110 R |
| 7,795,539 B2 | * | 9/2010 | Thuot | H01B 7/0275 174/110 R |
| 7,993,568 B2 | * | 8/2011 | Heffner | H01B 13/14 264/505 |
| 8,277,913 B2 | | 10/2012 | Henry et al. | |
| 9,449,741 B2 | * | 9/2016 | Abe | H01B 11/1834 |
| 2006/0118322 A1 | * | 6/2006 | Wiekhorst | H01B 7/0275 174/110 R |
| 2008/0296042 A1 | * | 12/2008 | Heffner | H01B 13/143 174/113 R |

OTHER PUBLICATIONS

Kynar Brochure from Arkema, Jan. 2017.

* cited by examiner

Primary Examiner — William H. Mayo, III

(57) ABSTRACT

Cables having foamed polymeric jackets that are suitable for air-blown may include at least one transmission media, such as one or more optical fibers or one or more twisted pairs. A jacket may be formed around the at least one transmission media. The jacket may be formed from or include an outer layer formed from foamed polymeric material. Additionally, an outer surface of the jacket may include a random distribution of surface variations. The surface variations may include a plurality of indentions and/or a plurality of protrusions.

20 Claims, 5 Drawing Sheets

CABLES WITH FOAMED INSULATION SUITABLE FOR AIR-BLOWN INSTALLATION

TECHNICAL FIELD

Embodiments of the disclosure relate generally to cables that include foamed outer jackets and, more particularly, to cables that include jackets formed from foamed polymeric material with surface variations that facilitate air-blown installation.

BACKGROUND

A wide variety of different types of cables are utilized to transmit signals. For example, communication cables, such as twisted pair and optical fiber cables, are utilized to transmit data signals. Plenum cables include cables designed for use in horizontal or plenum spaces within a facility, such as spaces utilized for heating and air conditioning systems. Applicable cable and fire standards, such as the National Fire Protection Act ("NFPA") standard 90A, require plenum cables to satisfy rigorous fire safety tests. As a result, plenum cables are typically constructed to include materials that increase flame resistance, reduce smoke generation, and/or limit flame spread.

In many applications, cables are installed in ducts or conduit. Conventional duct installation often involves pushing or pulling a cable into a duct. However, these conventional installation techniques are typically time consuming and may impart excessive stresses on transmission media included in cables. Installation can be improved by air-blowing a cable into a duct or conduit. Accordingly, there is an opportunity for cables that include foamed jackets that facilitate improved air-blown installation. In particular, there is an opportunity for improved cables having foamed jackets that include surface variations that facilitate air-blown installation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
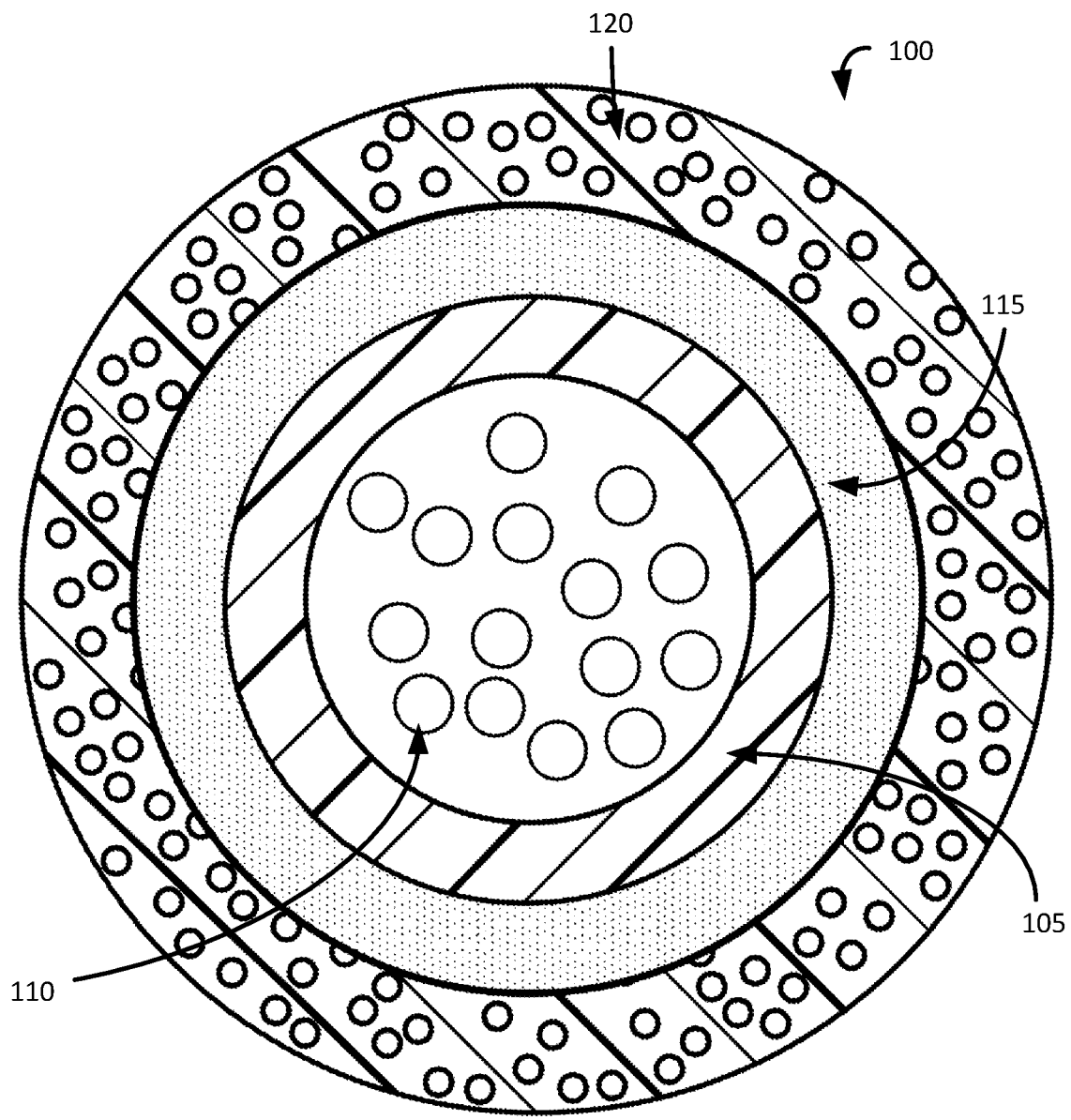
FIGS. 1-3 are cross-sectionals view of example cables that include foamed jackets that facilitate air-blown installation, according to illustrative embodiments of the disclosure.

Various embodiments of the present disclosure are directed to cables that are suitable for air-blown installation. A cable may include any suitable number of transmission media, such as one or more optical fibers, one or more twisted pairs of individually insulated conductors, one or more coaxial cable components, one or more power conductors, and/or a combination of different types of transmission media. Additionally, the cable may include a jacket formed around the transmission media. According to an aspect of the disclosure, the jacket may be formed from foamed polymeric material that includes surface variations on its outer surface. In certain embodiments, the surface variations may include indentions or dimples, such as concave indentions, formed into the outer surface. In other embodiments, the surface variations may include protrusions or bumps, such as convex protrusions, extending from the outer surface. In yet other embodiments, the surface variations may include a combination of indentions and protrusions.

A wide variety of suitable polymeric materials may be utilized to form a foamed jacket, such as polyvinylidene fluoride ("PVDF"), fluorinated ethylene propylene ("FEP"), polyvinyl chloride ("PVC"), flame retardant polyethylene ("FRPE"), or flame retardant polypropylene ("FRPP"). The foamed jacket may be formed with a wide variety of suitable foam rates as desired in various embodiments. For example, the polymeric material may be foamed at a rate between approximately ten percent (10%) and approximately 50%). In certain embodiments, the polymeric material may be foamed at a rate between approximately thirty percent (30%) and approximately forty percent (40%), such as a rate of approximately thirty-five percent (35%). Additionally, a wide variety of suitable methods or techniques may be utilized to form and/or process the polymeric material such that a plurality of surface variations are created. In certain embodiments, the polymeric material may be formed such that it has an open cell foam structure. In other embodiments, a surface of the polymeric material may be worked or processed as the material is extruded and/or following extrusion prior to the material cooling. The processing may modify the cell structure of the foamed polymeric material at its surface in order to create surface variations. Further, in certain embodiments, a foamed polymeric jacket may be formed without an outer skin layer, such as a solid skin layer positioned around the foamed material. In other embodiments, an outer skin layer may be utilized; however, the surface variations on an outer surface of the foamed material may impact the skin layer and lead to corresponding surface variations on the skin layer.

Any number of surface variations may be formed on an outer surface of a foamed jacket. Additionally, the surface variations may have a wide variety of suitable dimensions and configurations. In certain embodiments, the surface variations may be randomly distributed across or on the outer surface of the foamed material. The surface variations may also occupy any suitable percentage of the surface area of the outer surface. For example, the surface variations may occupy at least 10, 15, 20, 25, 30, 35, 40, 45, 50 percent, or greater of the surface area of the outer surface. Each surface variation may also have any suitable size and/or other dimensions. For example, a distance or other dimension (e.g., diameter, etc.) across each surface variation may be approximately ten micrometers (10 μm) or less.

As a result of including a plurality of surface variations, the coefficient of friction of foamed jackets may be less than those of conventional jackets. For example, a coefficient of friction of a foamed PVDF jacket with surface variations may be less than 0.20. The lower coefficient of friction may facilitate easier installation of cables that incorporate the inventive jackets. The surface variations may result in less contact area between a cable and conduit, thereby facilitate easier installation. For air-blown installation, the lower coefficient of friction and reduced contact area may facilitate longer blowing distances. Additionally, with air-blown installation, the surface variations may provide additional contact surfaces for air (or other gas) utilized to force a cable into a conduit, thereby facilitating easier blowing.

Certain example embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
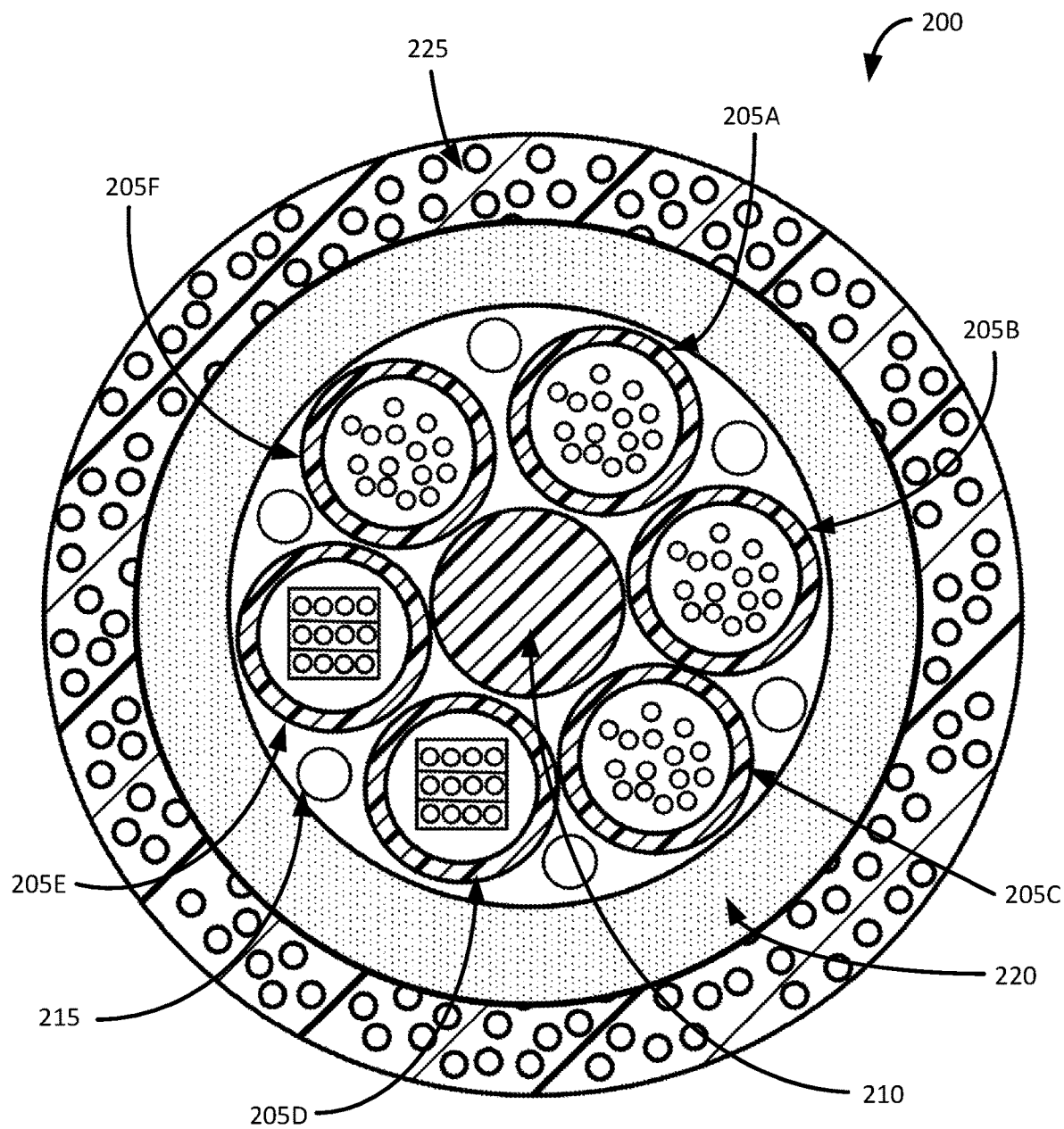
Figure 3:
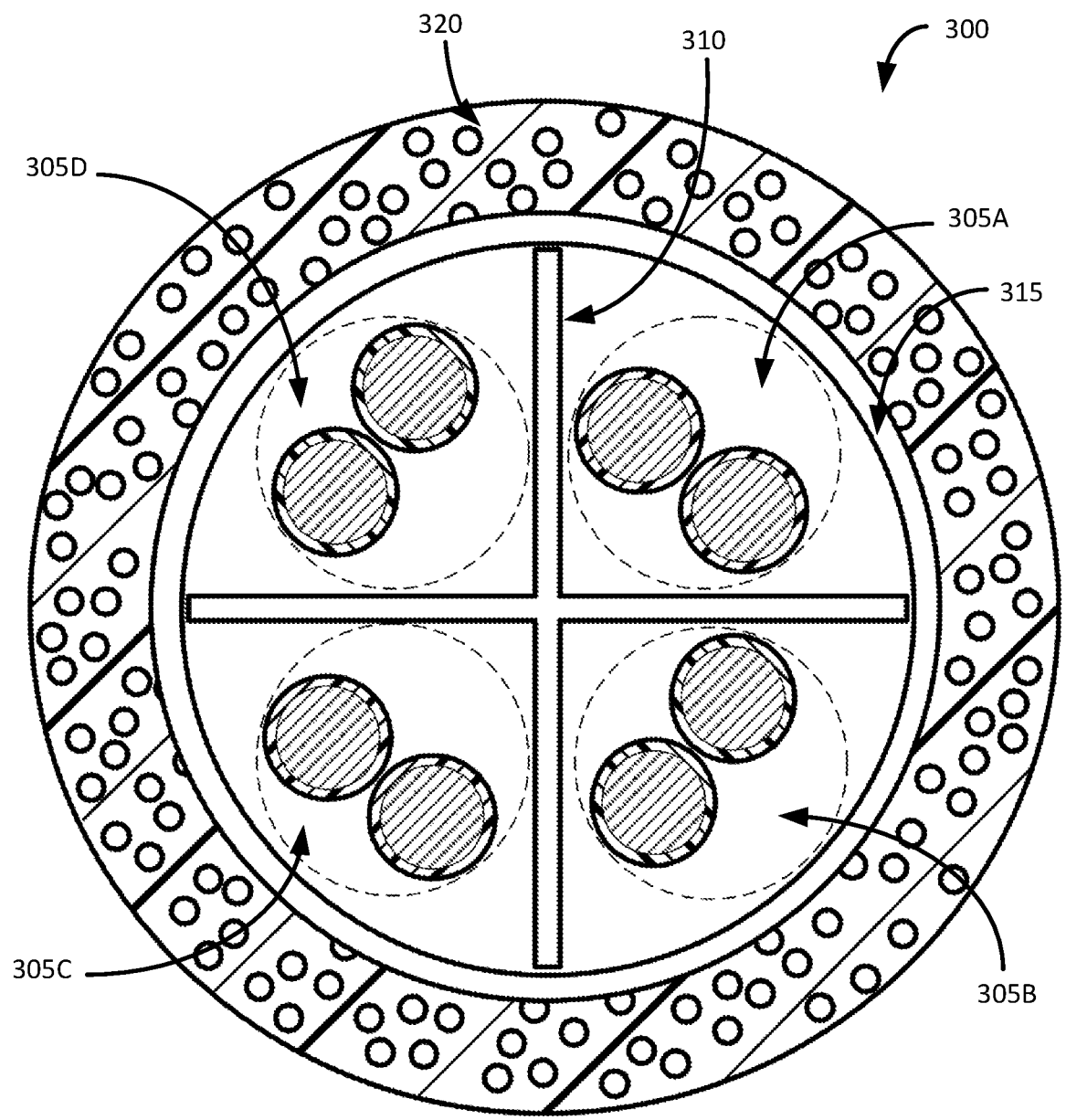

FIGS. 1-3 illustrate a few cable constructions that may incorporate foamed jackets having surface variations, according to illustrative embodiments of the disclosure. The described cables are provided by way of non-limiting example only, and it will be appreciated that a wide variety of other suitable cable constructions may include foamed jackets having a plurality of surface variations. These cable constructions may include any suitable transmission media and/or other cable components. For example, various cable constructions may include optical fibers, fiber ribbons, twisted pairs of individually insulated conductors, coaxial conductors, power conductors, and/or a combination of multiple types of transmission media. Additionally, as desired, cables may include separators, shields, strength members, water blocking components, buffer tubes, microtubes, ripcords, and/or a wide variety of other suitable components.

Turning now to FIG. 1, a cross-sectional view of an example optical fiber cable 100 is illustrated. The illustrated cable 100 may include a single buffer tube 105, and any number of optical fibers 110 may be disposed within the buffer tube 105. In certain embodiments, a water blocking layer 115 and/or a strength layer may be formed around the buffer tube 105. An outer jacket 120 may then be formed around the internal components of the cable 100. As desired, other cable designs, such as the cable illustrated in FIG. 2, may include a plurality of buffer tubes as well as any number of other cable components.

The buffer tube 105 may be situated within a cable core defined by the outer jacket 120, and the buffer tube 105 may be configured to contain or house optical fibers, such as the illustrated optical fibers 110. Additionally, the buffer tube 105 may be formed from a wide variety of suitable materials and/or combinations of materials, such as various polymeric materials, nucleated polymeric materials, etc. In certain embodiments, the buffer tube may be formed from a material that includes a polymeric base combined with one or more polymeric fillers. Additionally, the buffer tube 105 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins. As another example, a flame retarding or other suitable filler may be incorporated into a first layer but not into a second layer. Further, the buffer tube 105 may have any suitable inner and/or outer diameters as desired in various applications.

Any number of optical fibers 110, other transmission elements, and/or other components may be positioned within the buffer tube 105. In certain embodiments, optical fibers 110 may be loosely positioned in a tube, wrapped or bundled together, provided in one or more ribbons, or incorporated into a ribbon stack. FIG. 1 illustrates loose optical fibers 110 positioned in the buffer tube 105. In certain embodiments, water-blocking material (e.g., a water blocking gel, grease, etc.) may also be provided within the buffer tube 105. Alternatively, a buffer tube may be filled with a gas, such as air, powder, a moisture absorbing material, a water-swellable substance, dry filling compound, or foam material, for example in interstitial spaces between the optical fibers 110.

Each optical fiber 110 utilized in the cable 100 may be a single mode fiber, multi-mode fiber, multi-core fiber, or some other optical waveguide that carries data optically. Additionally, each optical fiber may be configured to carry data at any desired wavelength (e.g., 850 nm, 1310 nm, 1550 nm, etc.) and/or at any desired transmission rate or data rate. The optical fibers 110 may also include any suitable composition and/or may be formed from a wide variety of suitable materials capable of forming an optical transmission media, such as glass, a glassy substance, a silica material, a plastic material, or any other suitable material or combination of materials. Each optical fiber 110 may also have any suitable cross-sectional diameter or thickness.

The outer jacket 120 may define an outer periphery of the cable 100. The jacket 120 may enclose the internal components of the cable 100, seal the cable 100 from the environment, and provide strength and structural support. As desired, the jacket 120 may be characterized as an outer sheath, a casing, a circumferential cover, or a shell. According to an aspect of the disclosure, the jacket 120 may be formed at least partially from foamed polymeric material, and an outer surface of the jacket 120 may include a plurality of surface variations. As desired, the jacket 120 may also include flame retardant materials, smoke suppressant materials, and/or other suitable additives. In certain embodiments, the jacket 120 (or a layer or portion of the jacket 120) may be formed from a polymeric base material that has been combined with and/or blended with one or more filler materials, such as one or more dielectric filler materials. Example foamed jackets that may be incorporated into the cable 100 are described in greater detail below.

A wide variety of other components may be incorporated into the cable 100 as desired in various embodiments. In certain embodiments, at least one "rip cord" may be incorporated into the cable 100, and a ripcord may facilitate separating the jacket 120 from other components of the cable 100. As desired in various embodiments, any number of strength members may be incorporated into the cable 100 at a wide variety of suitable locations. For example, one or more strength members may be embedded in the jacket 120 or situated within a cable core. In yet other embodiments, the cable 100 may include an armor (not shown) inside the jacket 120. The armor may provide mechanical (e.g., rodent resistance, etc.) and/or electrical protection for transmission media situated within the cable core. The armor may be formed from a wide variety of suitable materials, such as a metal (e.g., steel, a copper alloy, etc.) tape that is formed into a tube, fiberglass, glass, epoxy, and/or appropriate polymeric materials. In certain embodiments, the armor may be formed as an interlocking armor or a corrugated armor.

As desired, the cable 100 may also include water swellable materials or water dams for impeding flow of any water that inadvertently enters the cable 100, for example due to damage of the outer jacket 120. Upon contact with water, water swellable materials may absorb the water and swell, helping to prevent the water from damaging the optical fibers 110. As shown in FIG. 1, a water swellable tape or wrap 115 may be positioned in a cable core and wrapped around one or more other cable components, such as the buffer tube 110. In other embodiments, a water swellable tape or wrap 115 may be positioned within the buffer tube. In other embodiments and as illustrated in FIG. 2, one or more water swellable materials (e.g., water swellable yarns, etc.) may be positioned in interstices between core components, such as between one or more buffer tubes or between one or more buffer tubes and a cable jacket 120. In yet other embodiments, individual core components may be partially or completely wrapped with water swellable materials. As desired in various embodiments, water swellable materials may be provided in a continuous or discontinuous manner along a longitudinal length of the cable 100. Additionally or alternatively, water blocking material (e.g., water blocking dams) may be intermittently incorporated into the cable core. A wide variety of suitable water blocking materials and/or combinations of materials may be utilized as desired.

FIG. 2 is a cross-sectional view of another example cable 200 that may include a foamed jacket having surface variations, according to an illustrative embodiment of the disclosure. The cable 200 of FIG. 2 may include certain components that are similar to the cable 100 of FIG. 1; however, the cable 200 of FIG. 2 may include a plurality of buffer tubes 205A-F rather than a single buffer tube. As shown, a plurality of buffer tubes 205A-F may be situated around a central strength member 210. Although six buffer tubes 205A-F are illustrated, any number of buffer tubes can be utilized. In other embodiments, the buffer tubes 205A-F may be situated around a central tube, a central group of twisted pairs, or other central cable component(s)). Additionally, although a single ring of buffer tubes 205A-F is illustrated, in other embodiments, multiple rings of buffer tubes may be utilized. As desired, one or more of the buffer tubes 205A-F may be replaced with other components, such as strength members or spacers. Indeed, a wide variety of suitable buffer tubes arrangements may be utilized.

Each of the buffer tubes 205A-F may be situated within a cable core. The buffer tubes 205A-F may be loosely positioned within the core or, alternatively, stranded or twisted together. Any number of transmission media, such as optical fibers, optical fiber ribbons, optical fiber ribbon stacks, and/or twisted pairs, may be situated within one or more of the buffer tubes 205A-F. Each buffer tube may be filled or unfilled as desired. Additionally, in certain embodiments, one or more water blocking components, such as water blocking yarns 215 and/or a water blocking tape 220 or wrap may also be positioned within the cable core. An outer jacket 225 may then be formed around the internal cable components, and the outer jacket 225 may define the cable core (or multiple cores).

As an alternative to one or more buffer tubes, a cable may include one or more tight-buffered optical fibers and/or one or more microtubes. A microtube may house any desired number of optical fibers, such as two, three, four, eight, twelve, or some other number of optical fibers. Additionally, a microtube may have a single layer or multi-layer construction, and the microtube may be formed from any suitable material or combination of materials. A microtube may also be formed with an inner diameter that is sized to allow the optical fibers to move relative to one another while preventing the optical fibers from crossing over or overlapping one another. In other words, the microtube may permit the optical fibers to flex or move as the cable is flexed or bent while simultaneously maintaining the position of each optical fiber relative to the other optical fibers. In certain embodiments, an inner diameter of the microtube may be determined based at least in part on the number of optical fibers to be positioned within the microtube and/or the outer diameters of the optical fibers. As a result of using one or more microtubes, it may be possible to reduce or minimize the diameter of a cable relative to cables that incorporate loose buffer tubes.

Each of the components illustrated in the cable 200 of FIG. 2 may be similar to the components previously described with reference to FIG. 1 above. For example, the jacket 225 may be formed at least partially from a foamed polymeric material. Additionally, an outer surface of the jacket 225 may include a plurality of surface variations. Example foamed jackets that may be incorporated into the cable 200 are described in greater detail below. A wide variety of other components may be incorporated into the cable 200 as desired in various embodiments including, but not limited to, one or more rip cords, strength yarns, strength members, armor layers, water blocking yarns, water blocking tapes, etc.

FIG. 3 illustrates a cross-sectional view of another example cable 300 that may include a foamed jacket having a plurality of surface variations. The cable 300 may be a twisted pair cable that includes one or more twisted pairs of individually insulated conductors. The cable 300 may include any number of twisted pairs of individually insulated conductors, such as the four illustrated twisted pairs 305A-D. Each twisted pair (generally referred to as twisted pair 305) can carry data or some other form of information, for example in a range of about one to ten Giga bits per second ("Gbps") or another appropriate transmission rate, whether faster or slower. A twisted pair 305 may include two electrical conductors, each covered with suitable insulation. As desired, each of the twisted pairs 305A-D may have the same twist lay length or alternatively, at least two of the twisted pairs may include a different twist lay length. For example, different twist lay lengths may function to reduce crosstalk between the twisted pairs 305A-D. The electrical conductors may be formed as solid or stranded conductors from any suitable electrically conductive material or combinations of material, such as copper, aluminum, silver, annealed copper, gold, or a conductive alloy. Additionally, the electrical conductors may have any suitable diameter, gauge, and/or other dimensions.

The insulation may include any suitable dielectric materials and/or combination of materials, such as one or more polymeric materials, one or more polyolefins (e.g., polyethylene, polypropylene, etc.), one or more fluoropolymers (e.g., fluorinated ethylene propylene ("FEP"), etc.), one or more polyesters, polyvinyl chloride ("PVC"), one or more flame retardant olefins, a low smoke zero halogen ("LSZH") material, etc.), etc. Additionally, the insulation may be formed from any number of layers (e.g., single layer, multi-layer, etc.). In the event that multiple layers are used, each of the layers may be formed from the same material(s) or, alternatively, at least two layers may be formed from different materials. Additionally, as desired, the insulation may be formed to include one or more layers of foamed material. The insulation may also include any number of additives or other materials, such as a flame retardant material and/or a smoke suppressant material.

Additionally, in certain embodiments, a flexible member or separator 310 may be provided between one or more twisted pairs 305A-D, and the separator 310 may assist in maintaining a desired orientation and/or desired positioning of one or more twisted pairs 305A-D. A separator 310 may be formed from a wide variety of suitable materials, such as polypropylene, PVC, polyethylene, FEP, ethylene chlorotrifluoroethlyene ("ECTFE"), or some other suitable polymeric or dielectric material. As desired, a separator 310 may be filled, unfilled, foamed, un-foamed, homogeneous, or inhomogeneous and may or may not include additives (e.g., smoke suppressants, etc.). In certain embodiments, the separator 310 may include electrically conductive material (e.g., electrically conductive patches, embedded electrically conductive material, etc.) that provide shielding for one or more of the twisted pairs 305A-D. Additionally, in various embodiments, a separator 310 may be continuous along a longitudinal length of the cable 300 or discontinuous (i.e., formed with a plurality of discrete or separator sections) along a longitudinal length of the cable 300.

A separator 310 may be formed in accordance with a wide variety of suitable dimensions, shapes, or designs. For example, a rod-shaped separator, a flat tape separator, a flat separator, an X-shaped or cross-shaped separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized. In certain embodiments, material may be cast or molded into a desired shape to form a separator 310. In other embodiments, a tape may be formed into a desired shape utilizing a wide variety of folding and/or shaping techniques. For example, a relatively flat tape separator may be formed into an X-shape or cross-shape as a result of being passed through one or more dies.

Twisted pairs 305A-D may be shielded or unshielded as desired in various embodiments. As shown, an overall shield 315 may be formed around all of the twisted pairs 305A-D. In other embodiments, twisted pairs 305A-D may be individually shielded or groups of twisted pairs may be shielded. A shield may be formed as either a continuous shield (e.g., a metallic foil shield, a braided shield, etc.) or as a discontinuous shield that includes discrete patches of electrically conductive material. A discontinuous shield may include electrically conductive patches having any suitable shape(s) and/or dimensions (e.g., lengths, etc.). Additionally, spaces or gaps formed between adjacent patches may have any suitable widths. Indeed, a wide variety of shielding arrangements are available for twisted pair conductors.

A jacket 320 may be formed around the internal components of the cable 300, and the jacket 320 may define one or more cable cores. The jacket 320 may be similar to the jacket 120 described in greater detail above with reference to FIG. 1. According to an aspect of the disclosure, the jacket 320 may be formed at least partially from foamed polymeric material. Additionally, a plurality of surface variations may be formed on an outer surface of the jacket 320. Example foamed jackets that may be incorporated into the cable 300 are described in greater detail below. A wide variety of other components may be incorporated into the cable 300 as desired in various embodiments including, but not limited to, one or more rip cords, flame retardant layers, water blocking layers, dielectric separators between the individual conductors of a twisted pair, etc.

Although FIGS. 1-3 illustrate optical fiber and twisted pair cables, embodiments of the disclosure are equally applicable to plenum cables and/or other types of cables that incorporate other types of transmission media, such as, coaxial conductors, power conductors, etc. Embodiments of the disclosure are also applicable to hybrid or composite cables that include multiple types of transmission media.

The cables 100, 200, 300 illustrated in FIGS. 1-3 are provided by way of example only to illustrate a few cable constructions that may include foamed jackets. A wide variety of other cable constructions may be utilized as desired in various embodiments. The cable constructions may include any suitable transmission media and/or other components may be incorporated into a cable as desired in other embodiments. Additionally, a cable may be designed to satisfy any number of applicable cable standards. These standards may include various operating environment requirements (e.g., temperature requirements), signal performance requirements, burn testing requirements, etc.

Regardless of the cable construction, in accordance with an aspect of the disclosure, a cable may include a jacket formed at least partially from foamed material. For example, the jackets 120, 225, 320 in FIGS. 1-3 may be formed from foamed polymeric material. In certain embodiments, as shown in FIGS. 1-3, a jacket may be formed as a single layer of foamed material. In other embodiments, a jacket may include a plurality of layers of material. As desired in certain embodiments, multiple layers may be formed from similar materials (i.e., foamed PVDF). In other embodiments, at least two layers of a jacket may be formed from different materials.

In other embodiments, a jacket may include a plurality of layers of material and at least two layers may be formed utilizing different techniques. For example, a first layer may be formed from solid material while a second layer is formed from foamed material. In certain embodiments, a foamed layer may be formed as an outermost layer of the jacket. Use of an inner solid polymeric layer may provide enhanced stiffness and/or structural support to the jacket while the foamed layer provides reduced friction. In certain embodiments, use of an inner solid layer may also permit a higher foaming rate of the foamed layer while still allowing the jacket to provide sufficient structural support for the cable. In certain embodiments, an inner solid layer and an outer foamed layer may be formed from the same or similar polymeric materials. In other embodiments, a solid layer and a foamed layer may be formed from different polymeric materials.

In yet other embodiments, a jacket may include a skin layer (e.g., a thin layer of solid material) formed over a foamed layer or an outer foamed layer of a multi-layer base (e.g., a combination of an inner solid layer and a foamed layer). In the event that a skin layer is utilized, the surface variations of the underlying foamed layer may also impact the skin layer. In other words, the surface variations on a foamed layer may cause or result in corresponding surface variations on a skin layer formed around the foamed layer. In other embodiments, a jacket may be formed without a skin layer.

A wide variety of suitable polymeric materials may be utilized to form a foamed jacket (or a foamed outer layer of a jacket or an outer foamed layer of a multi-layer base) as desired in various embodiments. Examples of suitable polymeric materials include, but are not limited to, polyvinylidene fluoride ("PVDF"), fluorinated ethylene propylene ("FEP"), other foamed fluoropolymers, polyvinyl chloride ("PVC"), flame retardant polyethylene ("FRPE"), flame retardant polypropylene ("FRPP"), other flame retardant polymeric materials, a low smoke zero halogen material, etc. In certain embodiments, a foamed jacket (or jacket layer) may be formed from PVDF, FEP, or another foamed fluoropolymer. In other embodiments, a foamed jacket (or jacket layer) may be formed from PVC, FRPE, FRPP, or another suitable polymer. In yet other embodiments, a blend of two or more polymeric materials may be utilized to form a foamed jacket (or a foamed jacket layer).

A jacket and/or various layers of a jacket may also be formed with any suitable thickness. For example, a foamed jacket (or foamed jacket layer) may be formed with a thickness between approximately 0.20 mm and approximately 2.54 mm. In various embodiments, a foamed jacket (or foamed jacket layer) may have a thickness of approximately 0.20, 0.30, 0.40, 0.50, 0.60, 0.80, 1.0, 1.25, 1.5, 1.75, 2.0, 2.25, 2.50, or 2.54 mm, a thickness included in a range between any two of the above values, or a thickness included in a range bounded on either a minimum or maximum end by one of the above values.

A foamed jacket (or foamed jacket layer) may be formed with a wide variety of suitable foam rates as desired in various embodiments. For example, the polymeric material may be foamed at a rate between approximately ten percent (10%) and approximately fifty percent (50%). In certain embodiments, the polymeric material may be foamed at a rate between approximately thirty percent (30%) and approximately forty percent (40%), such as a rate of approximately thirty-five percent (35%). In various embodiments, the polymeric material may be foamed at a rate of approximately 10, 15, 20, 25, 30, 35, 40, 45, or 50 percent, at a foam rate included in a range between any two of the above values, or at a foam rate included in a range bounded on a minimum end by one of the above values (e.g., a foam rate of at least 30 percent, etc.).

A wide variety of methods or techniques may be utilized to foam the polymeric material incorporated into a jacket. For example, one or more foaming agent may be added to a polymer. Foaming agents may be added at any suitable concentrations or amounts in order to achieve a desired foam rate. In certain embodiments, a chemical foaming agent or a foam concentrate may be utilized. In other embodiments, foaming may be facilitated by injection of a gas foaming agent (e.g., Freon, nitrogen, etc.). Typically, a foaming agent may be added to a polymer during processing of the polymer within an extrusion system. The extrusion system may then extrude the polymer onto a cable as a jacket layer.

In addition to polymeric material and a foaming agent, a wide variety of fillers and/or other additives may be incorporated into a foamed jacket layer as desired in various embodiments. These additives include, but are not limited to, flame retardant materials, impact modifiers, smoke suppressants, dyes, and/or colorants. Additives or fillers may be added in any suitable amounts, rates, or levels.

According to an aspect of the disclosure, an outer surface of a foamed jacket (or foamed jacket layer) may include a plurality of surface variations. The surface variations may include relatively small variations in a thickness of the jacket that result in the jacket having a lower coefficient of friction and/or a reduced contact area with surfaces or components (e.g., a conduit or duct) adjacent to the jacket. In certain embodiments, the surface variations may include indentions or dimples, such as concave indentions, formed into or extending into the outer surface. In other embodiments, the surface variations may include protrusions or bumps, such as convex protrusions, extending from the outer surface. In yet other embodiments, the surface variations may include a combination of indentions and protrusions. FIGS. 4A-4D, which are described in greater detail below, illustrate examples of foamed material that include indentions and/or protrusions.

The surface variations may have a wide variety of suitable dimensions and/or sizes. For example, each surface variation may have any suitable diameter, span, distance across the surface variation, depth (e.g., depth of an indention from the outer surface, etc.), thickness (e.g., thickness or distance of protrusion from the outer surface, etc.), and/or other dimensions. As set forth above, the surface variations may be formed as relatively small surface variations. In certain embodiments, a largest span or largest distance across a surface variation along the outer surface may be approximately ten micrometers (10 μm) or less. In various embodiments, a respective distance across a surface variation may be approximately 1, 2, 3, 4, 5, 6, 7, 8, 9, or 10 micrometers, a distance included in a range between any two of the above values (e.g., a distance between approximately 1 μm and approximately 7 μm), or a distance included in a range round bounded on a maximum end by one of the above values. In certain embodiments, the surface variations may each have an approximately circular cross-sectional shape (e.g., a convex or concave shape) along the outer surface.

Any number of surface variations may be formed on an outer surface of a foamed jacket (or foamed jacket layer), and a plurality of surface variations may be arranged in a wide variety of suitable configurations. In certain embodiments, the surface variations may be randomly distributed across or on the outer surface of the foamed polymeric material. In other words, the surface variations may not be arranged in accordance with a repeating pattern. The surface variations may also occupy any suitable percentage of the surface area of the outer surface. For example, the surface variations may occupy at least 10 percent or greater of the surface area of the outer surface. In various embodiments, the surface variations may occupy at least 10, 15, 20, 25, 30, 40, 45, 50, 60, 70, or 75 percent or greater of the surface area of the outer surface.

A wide variety of suitable methods and/or techniques may be utilized to form and/or process the polymeric material such that a plurality of surface variations are created. In certain embodiments, the polymeric material may be formed such that it has an open cell foam structure. In other embodiments, a surface of the polymeric material may be worked or processed as the polymeric material is extruded and/or following extrusion prior to the polymeric material cooling. The processing may modify the cell structure of the foamed polymeric material at its surface in order to create surface variations. For example, the temperature of an extrusion exit die may be increased such that the outer surface of an extruded polymeric jacket layer is modified to include surface variations.

A foamed polymeric jacket layer that includes a plurality of surface variations may have a wide variety of suitable coefficients of friction. For example, the coefficient of friction of foamed polymeric jackets with surface variations may be less than those of conventional jackets made from the same polymers. In certain embodiments, a coefficient of friction (e.g., a static coefficient of friction, a dynamic coefficient of friction, etc.) of a foamed PVDF jacket with surface variations may be less than 0.20. In other embodiments, a coefficient of friction of a foamed PVDF jacket with surface variations may be less than 0.25, 0.22, 0.20, 0.18, or 0.15. Other polymeric materials may also have lower coefficients of friction. For example, conventional PE may have a coefficient of friction of approximately 0.20. Foaming the PE such that a plurality of surface variations are formed on its outer surface may lower the coefficient of friction to approximately 0.15, 0.125, 0.10, or lower. As another example, conventional PP may have a coefficient of friction of approximately 0.30. Foaming the PP such that a plurality of surface variations are formed on its outer surface may lower the coefficient of friction to approximately 0.20, 0.15, 0.125, 0.10, or lower. The lower coefficient of friction may facilitate easier installation of cables that incorporate the foamed jackets.

Further, in certain embodiments, a foamed jacket may be formed without an outer skin layer, such as a solid skin layer positioned around the foamed material. In other words, the jacket may include one or more layers of material, and an outermost layer of the jacket may be formed from foamed material that includes surface variations. In other embodiments, a relatively thin solid skin layer may be formed around an outermost foamed layer that includes surface variations. The skin layer may be thin enough that the surface variations on the underlying foamed layer also impact the skin layer. In other words, surface variations on the foamed layer may result in corresponding surface variations on the skin layer. For example, protrusions on the underlying foamed layer may result in corresponding protrusions on the skin layer. As another example, indentions on the underlying foamed layer may result in indentions on the skin layer.

In the event that a skin layer is used, the skin layer may be formed from a wide variety of suitable materials and with a wide variety of suitable dimensions. In certain embodiments, the skin layer may be formed from the same material as an underlying foamed layer. For example, a solid PVDF skin layer may be formed over a foamed PVDF layer. In other embodiments, the skin layer may be formed from a different material than an underlying foamed layer. Additionally, a skin layer may be formed with a wide variety of suitable thicknesses. For example, a skin layer may be formed with a thickness between approximately 0.03 mm and approximately 0.50 mm. In various embodiments, a skin layer may be formed with a thickness of approximately 0.03, 0.05, 0.07, 0.10, 0.15, 0.20, 0.25, 0.30, 0.35, 0.40, 0.45, or 0.50 mm, a thickness included in a range between any two of the above values, or a thickness included in a range bounded on either a minimum or maximum end by one of the above values. In certain embodiments, a skin layer may have a small enough thickness that permits corresponding surface variations to be formed on the skin layer.

As a result of including a plurality of surface variations on a foamed jacket, a coefficient of friction of the jacket may be reduced relative to conventional cables. The surface variations may result in less contact area between a cable and conduit, thereby facilitate easier installation of the cable. For air-blown installation, the lower coefficient of friction and reduced contact area may facilitate longer blowing distances. Additionally, with air-blown installation, the surface variations may provide additional contact surfaces for air (or other gas) utilized to force a cable into a conduit, thereby facilitating easier blowing. For example, as air is blown against a cable and into a conduit, the air will catch on or be captured by the surface variations, thereby enhancing the blowing forces exerted on the cable. As a result, the cable may be blown further through the conduit relative to conventional cables.

Additionally, in certain embodiments, the jacket may facilitate installation of a cable within a plenum environment. In other words, the jacket may be formed from flame retardant materials (e.g., PVDF, FEP, PVC, FRPE, FRPP, etc.) that assists a cable in satisfying the fire safety requirements of one or more plenum standards. A cable incorporating a foamed jacket may satisfy a wide variety of suitable plenum standards such as National Fire Protection Association ("NFPA") standards NFPA 90A and NFPA 262. Further, although certain solid materials, such as solid PVDF, may negatively impact the electrical performance of a twisted pair cable due to adverse effects resulting from the dielectric constant and dissipation factor of the material, foaming a jacket mitigates the negative impacts. The foaming process effectively reduces the dielectric constant and the dissipation factor of the polymeric material by introducing air (or gas) in lieu of solid high loss material. As a result, a cable incorporating a foamed polymeric jacket (e.g., a foamed PVDF jacket, etc.) may satisfy a wide variety of suitable electrical performance standards. For example, a twisted pair cable may satisfy a Category 5, Category 5e, Category 6, Category 6A, Category 8 or other Category cable standard, such any of the standards set forth in ANSI/TIA-568 established by the Telecommunications Industry Association ("TIA").

Figure 4A:
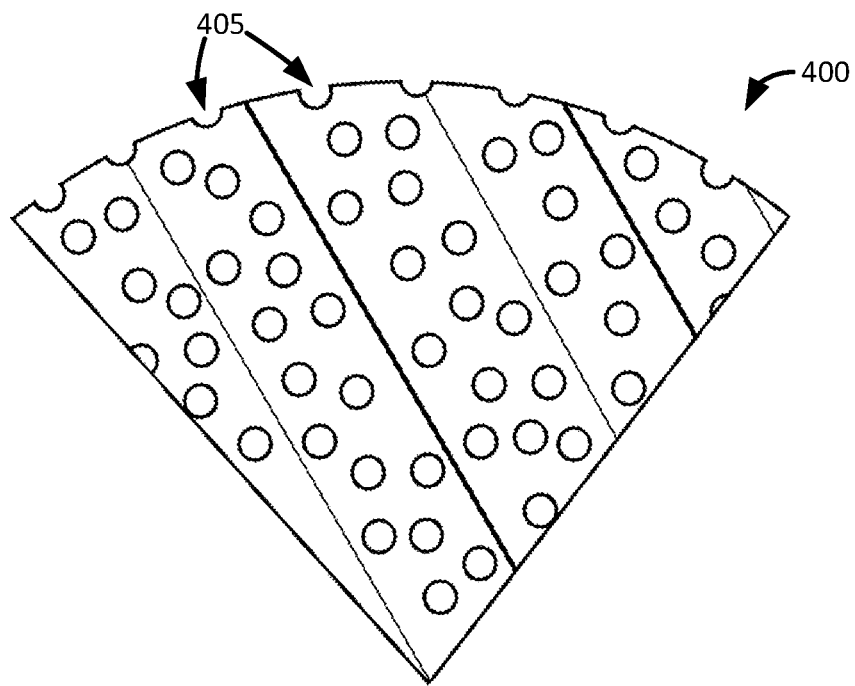
FIGS. 4A-4D are cross-sectional views of example foamed jackets that include surface variations, according to illustrative embodiments of the disclosure.

FIGS. 4A-4D illustrates cross-sectional views of example foamed polymeric insulation that includes surface variations, according to illustrative embodiments of the disclosure. Any of the example insulation illustrated in FIGS. 4A-4C may be utilized to form a cable jacket or a foamed layer of a cable jacket. Turning first to FIG. 4A, a cross-sectional view of first foamed polymeric insulation 400 is illustrated. The insulation 400 includes a plurality of indentions or divots 405 formed on its outer surface. As set forth above, these indentions 405 may be formed with a wide variety of suitable dimensions. For example, a span or distance across each indention 405 (e.g., a span at the outer surface, etc.) may be less than or equal to approximately 10 μm. Additionally, each indention 405 may have a wide variety of suitable shapes. For example, each indention 405 may have a circular or rounded shape, thereby resulting in an approximately concave indention. In certain embodiments, an indention 405 may be formed as a result of a foaming bubble being burst or partially exposed at the outer surface.

Figure 4B:
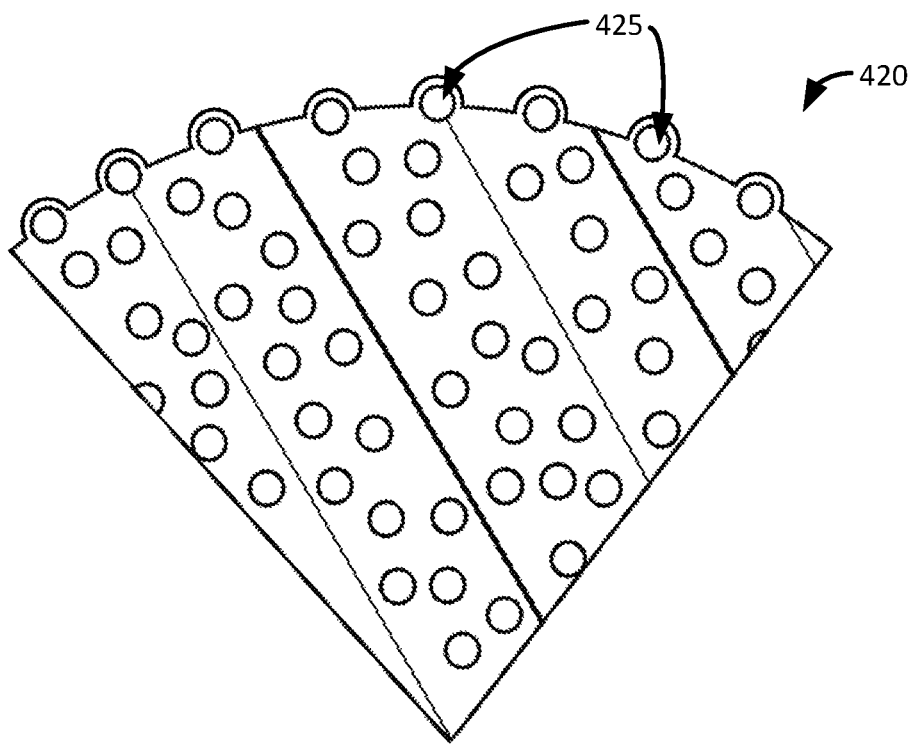

FIG. 4B illustrates a cross-sectional view of second foamed polymeric insulation 420. The insulation 420 includes a plurality of protrusions or bumps 425 formed on its outer surface. As set forth above, these protrusions 425 may be formed with a wide variety of suitable dimensions. For example, a span or distance across each protrusion 425 (e.g., a span at the outer surface, etc.) may be less than or equal to approximately 10 μm. Additionally, each protrusion 420 may have a wide variety of suitable shapes. For example, each protrusion 425 may have a circular or rounded shape, thereby resulting in an approximately convex protrusion. In certain embodiments, a protrusion 425 may be formed as a result of a foaming bubble being formed at or near the outer surface without being burst or ruptured. The bubble may cause the polymeric material at the outer surface to protrude or extend away from the remainder of the insulation layer.

Figure 4C:
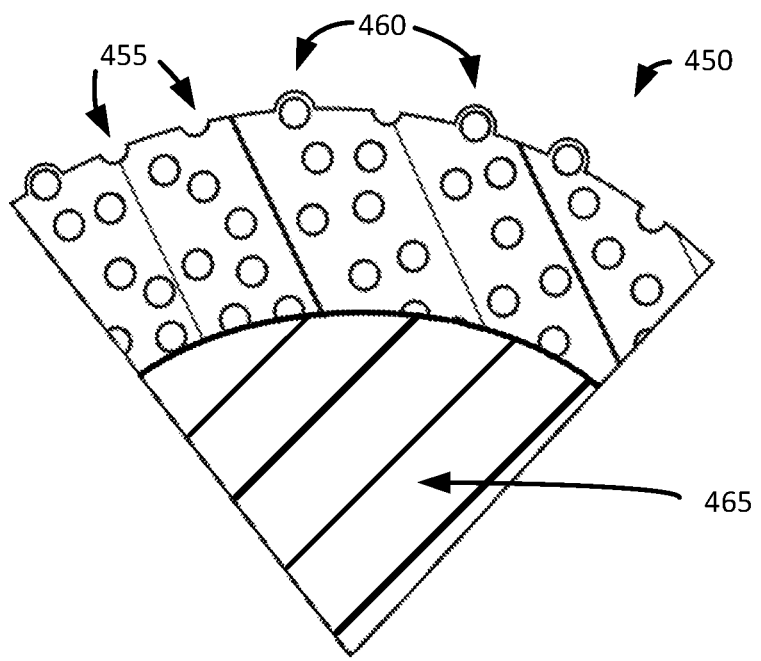

FIG. 4C illustrates a cross-sectional view of third foamed polymeric insulation 450. The insulation 450 includes a plurality of indentions 455 and a plurality of protrusions 460. In other words, a first portion of the surface variations may include indentions 455 while a second portion of the surface variations may include protrusions 460. As set forth above, the various surface variations may be formed with a wide variety of suitable dimensions and/or shapes. With continued reference to FIG. 4C, in certain embodiments, the foamed polymeric insulation 450 may be formed over a solid insulation layer 465. Use of an inner solid polymeric layer 465 may provide enhanced stiffness and/or structural support to the jacket while the foamed layer 450 provides reduced friction. In certain embodiments, use of an inner solid layer 465 may also permit a higher foaming rate of the foamed layer 450 while still allowing the jacket to provide sufficient structural support for a cable. In certain embodiments, an inner solid layer 465 and an outer foamed layer 450 may be formed from the same or similar polymeric materials. In other embodiments, a solid layer 465 and a foamed layer 450 may be formed from different polymeric materials.

Figure 4D:
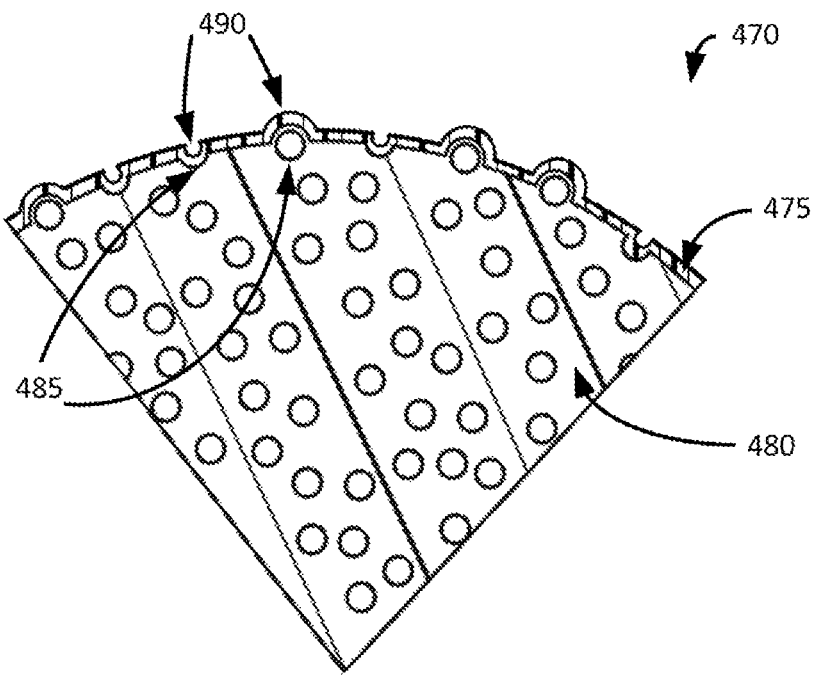

FIG. 4D illustrates a cross-sectional view of fourth foamed polymeric insulation 470. The insulation 470 includes a relatively thin solid skin layer 475 formed over a foamed layer 480. The foamed layer 480 may include a plurality of surface variations 485, such as a plurality of indentions and/or protrusions. Additionally, the skin layer 475 may be impacted by the surface variations 485 of the underlying foamed layer 480. In other words, the surface variations 485 on the foamed layer 480 may result in or cause the formation of corresponding surface variations 490 on the relatively thin skin layer.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

That which is claimed:

1. A communications cable comprising:
    at least one transmission media surrounded by one or more polymeric insulating layers; and
    an outer jacket formed around the at least one transmission media and the one or more polymeric insulating layers, the outer jacket comprising foamed polymeric material and having an outer surface comprising a random distribution of surface variations, the surface variations comprising at least one of (i) a plurality of convex protrusions or (ii) a plurality of concave indentions, wherein a respective distance across each surface variation is less than or equal to ten micrometers.

2. The communications cable of claim 1, wherein the polymeric material comprises one of (i) polyvinylidene fluoride, (ii) fluorinated ethylene propylene, (iii) polyvinyl chloride, (iv) flame retardant polyethylene, or (v) flame retardant polypropylene.

3. The communications cable of claim 1, wherein the polymeric material is foamed at a rate between ten percent and fifty percent.

4. The communications cable of claim 1, wherein the polymeric material is foamed at a rate between thirty percent and forty percent.

5. The communications cable of claim 1, wherein the polymeric material comprises an open cell foam structure.

6. The communications cable of claim 1, wherein the outer jacket does not include a solid skin layer.

7. The communications cable of claim 1, wherein the surface variations occupy at least ten percent of the area of the outer surface.

8. The communications cable of claim 1, wherein the at least one transmission media comprises at least one of (i) an optical fiber or (ii) a twisted pair of conductors individually insulated by the one or more polymeric insulating layers.

9. A cable comprising:
    at least one transmission media;
    one or more polymeric insulating layers formed around the at least one transmission media; and
    an outer jacket formed around the at least one transmission media and the one or more polymeric insulating layers, the outer jacket comprising foamed polymeric material and having a plurality of thickness variations formed on an outer surface, the thickness variations comprising at least one of (i) a plurality of convex protrusions or (ii) a plurality of concave indentions, wherein a respective distance across each of the thickness variations is less than or equal to ten micrometers.

10. The cable of claim 9, wherein the polymeric material comprises one of (i) polyvinylidene fluoride, (ii) fluorinated ethylene propylene, (iii) polyvinyl chloride, (iv) flame retardant polyethylene, or (v) flame retardant polypropylene.

11. The cable of claim 9, wherein the plurality of thickness variations are random distributed on the outer surface.

12. The cable of claim 9, wherein the polymeric material is foamed at a rate between ten percent and fifty percent.

13. The cable of claim 9, wherein the polymeric material is foamed at a rate between thirty percent and forty percent.

14. The cable of claim 9, wherein the polymeric material comprises an open cell foam structure.

15. The cable of claim 9, wherein the outer jacket does not include a solid skin layer.

16. The cable of claim 9, wherein the thickness variations occupy at least ten percent of the area of the outer surface.

17. The cable of claim 9, wherein the at least one transmission media comprises at least one optical fiber and the one or more polymeric insulating layers comprises a buffer layer formed around the at least one optical fiber.

18. The cable of claim 9, wherein the at least one transmission media comprises a twisted pair of conductors and the one or more polymeric insulating layers comprise respective insulation formed around each of the conductors.

19. A cable comprising:
    at least one transmission media surrounded by one or more polymeric insulating layers; and
    an outer jacket formed around the at least one transmission media and the one or more polymeric insulating layers, the outer jacket comprising foamed polymeric material and having a plurality of thickness variations formed in a random distribution on an outer surface, the thickness variations comprising at least one of (i) a plurality of protrusions or (ii) a plurality of indentions, wherein a respective distance across each of the plurality of thickness variations is less than ten micrometers.

20. The cable of claim 19, wherein the polymeric material comprises one of (i) polyvinylidene fluoride, (ii) fluorinated ethylene propylene, (iii) polyvinyl chloride, (iv) flame retardant polyethylene, or (v) flame retardant polypropylene.

\* \* \* \* \*